United States Patent
Yu et al.

(10) Patent No.: US 11,787,985 B2
(45) Date of Patent: Oct. 17, 2023

(54) ADHESIVE FILM FOR POLARIZING PLATES, POLARIZING PLATE INCLUDING THE SAME AND OPTICAL DISPLAY INCLUDING THE SAME

(71) Applicant: SAMSUNG SDI CO., LTD., Yongin-si (KR)

(72) Inventors: Mi Yeon Yu, Suwon-si (KR); Seung Jun Lee, Suwon-si (KR); Woo Jin Jeong, Suwon-si (KR); Ha Yun Cho, Suwon-si (KR); Il Jin Kim, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 162 days.

(21) Appl. No.: 17/190,772

(22) Filed: Mar. 3, 2021

(65) Prior Publication Data
US 2021/0284878 A1    Sep. 16, 2021

(30) Foreign Application Priority Data
Mar. 16, 2020  (KR) .................. 10-2020-0032268

(51) Int. Cl.
*C09J 133/12*  (2006.01)
*G02B 5/30*  (2006.01)
(Continued)

(52) U.S. Cl.
CPC .............. *C09J 133/12* (2013.01); *C09J 7/29* (2018.01); *C09J 7/30* (2018.01); *C09J 11/06* (2013.01);
(Continued)

(58) Field of Classification Search
CPC ............ B32B 2307/40; B32B 2307/42; B32B 2307/71; B32B 2457/20; B32B 2457/206;
(Continued)

(56) References Cited

U.S. PATENT DOCUMENTS

| 2012/0171482 A1* | 7/2012 | Ki ............................. C09J 7/38 |
| | | 428/354 |
| 2013/0005909 A1* | 1/2013 | Natsui ................... C09J 133/14 |
| | | 525/205 |

(Continued)

FOREIGN PATENT DOCUMENTS

| CN | 102533172 A | 7/2012 |
| CN | 102816545 A | 12/2012 |

(Continued)

OTHER PUBLICATIONS

Chinese Office Action in corresponding Chinese Patent Application No. 202110245771.7, Chinese Office Action dated Mar. 30, 2022 (8 pgs.).

(Continued)

*Primary Examiner* — Eli D. Strah
(74) *Attorney, Agent, or Firm* — Lewis Roca Rothgerber Christie LLP

(57) ABSTRACT

An adhesive film for polarizing plates, a polarizing plate including the same, and an optical display including the same are provided. The adhesive film for polarizing plates is formed of an adhesive composition comprising: a (meth) acrylic copolymer; an adhesion promoter; a mixture of an isocyanate curing agent and a carbodiimide curing agent; and a UV absorbent, and the adhesive film has a glass transition temperature of about −47° C. to −40° C., and the adhesive film has a light transmittance of about 3% or less at a wavelength of about 380 nm.

16 Claims, 1 Drawing Sheet

(51) Int. Cl.
*C09J 7/29* (2018.01)
*C09J 7/30* (2018.01)
*C09J 11/06* (2006.01)
*C09J 133/10* (2006.01)
*C09J 133/08* (2006.01)

(52) U.S. Cl.
CPC .......... *G02B 5/305* (2013.01); *B32B 2307/40* (2013.01); *B32B 2307/42* (2013.01); *B32B 2307/71* (2013.01); *B32B 2457/20* (2013.01); *B32B 2457/206* (2013.01); *C09J 133/08* (2013.01); *C09J 133/10* (2013.01); *C09J 2203/318* (2013.01); *C09K 2323/057* (2020.08)

(58) Field of Classification Search
CPC ............. C08F 220/1804; C08F 220/20; C08G 18/003; C08G 18/6229; C08G 18/725; C08G 18/8029; C08K 5/0025; C08K 5/5435; C08K 5/3492; C08K 5/3475; C08L 2203/206; C08L 45/00; C08L 93/00; C09J 7/10; C09J 7/255; C09J 7/29; C09J 7/30; C09J 11/06; C09J 11/08; C09J 133/066; C09J 133/08; C09J 133/10; C09J 133/12; C09J 175/04; C09J 2203/318; C09J 2203/326; C09J 2301/312; C09J 2301/408; C09J 2433/00; C09J 2467/006; C09K 2323/057; G02B 5/22; G02B 5/30; G02B 5/3033; G02B 5/305; G02F 1/1335
See application file for complete search history.

(56) References Cited

U.S. PATENT DOCUMENTS

| | | | | |
|---|---|---|---|---|
| 2013/0085215 A1* | 4/2013 | Shitara | ...................... | C09J 7/385 524/100 |
| 2013/0165597 A1* | 6/2013 | Kim | ................... | C08G 18/6229 525/342 |
| 2015/0284596 A1* | 10/2015 | Nakada | ............... | C08F 297/026 525/309 |
| 2015/0346408 A1* | 12/2015 | Mizutani | ........... | C08F 220/1804 428/41.5 |

FOREIGN PATENT DOCUMENTS

| | | |
|---|---|---|
| CN | 103184019 A | 7/2013 |
| JP | 2009-191149 A | 8/2009 |
| JP | 2013-072951 A | 4/2013 |
| KR | 10-2012-0077667 A | 7/2012 |
| KR | 10-2013-0035963 A | 4/2013 |
| KR | 10-2015-0003780 A | 1/2015 |

OTHER PUBLICATIONS

Korean Office Action dated Jan. 30, 2023 issued in corresponding Korean Patent Application No. 10-2020-0032268 (5 pages).

* cited by examiner

ADHESIVE FILM FOR POLARIZING PLATES, POLARIZING PLATE INCLUDING THE SAME AND OPTICAL DISPLAY INCLUDING THE SAME

CROSS-REFERENCE TO RELATED APPLICATION

This application claims priority to and the benefit of Korean Patent Application No. 10-2020-0032268, filed on Mar. 16, 2020 in the Korean Intellectual Property Office, the entire disclosure of which is incorporated herein by reference.

BACKGROUND

1. Field

Aspects of embodiments of the present invention relate to an adhesive film for polarizing plates, a polarizing plate including the same, and an optical display including the same.

2. Description of Related Art

Recently, as optical display devices have become thinner, methods of reducing the thickness of an adhesive film for polarizing plates have been studied.

However, as the thickness of the adhesive film for a polarizing plate decreases, a thin adhesive film for a polarizing plate may have high creep and decreased cohesive strength. For this reason, the thin adhesive film for a polarizing plate may have poor processability in cutting and/or processing. It is known that there is a trade-off relation between peel strength and cohesive strength in adhesive films. So, when the cohesive strength of the adhesive film is increased, the peel strength becomes decreased, and when the cohesive strength is lowered, the peel strength becomes increased. Accordingly, there is a need for an adhesive film for a polarizing plate capable of securing both cohesive strength and peel strength even when the adhesive film has a thin thickness.

Meanwhile, an organic light emitting device is likely to be damaged by UV light incident from the outside. Therefore, a polarizing plate or an adhesive film for polarizing plates needs to be provided with UV blocking properties.

The background technique of the present invention is disclosed in JP 2013-072951.

SUMMARY

According to an aspect of embodiments of the present invention, an adhesive film for polarizing plates having a low light transmittance at a wavelength of about 380 nm is provided.

According to another aspect of embodiments of the present invention, an adhesive film for polarizing plates having a thickness of about 15 μm or less, peel strength of about 700 gf/inch or more with respect to an adherend, and a creep of about 100 μm or less at about 25° C. is provided.

According to another aspect of embodiments of the present invention, an adhesive film for polarizing plates having a thickness of about 15 μm or less, and is free from a bleed-out of an UV absorbent is provided.

According to one or more embodiments of the present invention, an adhesive film for polarizing plates is formed of an adhesive composition comprising: a (meth)acrylic copolymer; an adhesion promoter; a mixture of an isocyanate curing agent and a carbodiimide curing agent; and a UV absorbent, the adhesive film has a glass transition temperature of about −47° C. to about −40° C., and the adhesive film has a light transmittance of about 3% or less at a wavelength of about 380 nm.

The adhesive film for polarizing plates may have a peel strength of about 700 gf/inch or more with respect to a glass plate at about 25° C., and a creep of about 100 μm or less at about 25° C.

The UV absorbent may be in a liquid state at 25° C., and may include a hydroxyphenyl triazine-based UV absorbent.

The UV absorbent may have a maximum absorption wavelength of about 300 nm to about 400 nm.

The isocyanate curing agent may include an aromatic isocyanate or an adduct of an aromatic isocyanate to a polyol compound.

The adhesion promoter may comprise an aromatic modified terpene resin having a glass transition temperature of about 90° C. or more.

The aromatic modified terpene resin having a glass transition temperature of about 90° C. or more may have a weight average molecular weight of about 900 or more.

The aromatic modified terpene resin having a glass transition temperature of about 90° C. or more may be present in an amount of about 1 part by weight to about 10 parts by weight, relative to about 100 parts by weight of the (meth)acrylic copolymer.

The (meth)acrylic copolymer may include a copolymer of a monomer mixture comprising about 60 wt % to about 99 wt % of an alkyl group-containing (meth)acrylic monomer and about 1 wt % to about 40 wt % of a hydroxyl group-containing (meth)acrylic monomer.

The adhesive composition may comprise: about 100 parts by weight of the (meth)acrylic copolymer, about 0.1 part by weight to about 3 parts by weight of the UV absorbent, about 0.5 parts by weight to about 20 parts by weight of the isocyanate curing agent, about 0.01 part by weight to about 0.5 parts by weight of the carbodiimide curing agent, and about 1 part by weight to about 10 parts by weight of the adhesion promoter.

The adhesive film for polarizing plates may have a thickness of about 15 μm or less.

According to one or more embodiments of the present invention, a polarizing plate comprises: a polarizer; and the above-described adhesive film for polarizing plates.

According to one or more embodiments of the present invention, an optical display comprises the above-described polarizing plate comprising the above-described adhesive film.

According to an aspect of embodiments of the present invention, an adhesive film for polarizing plates having a low light transmittance at a wavelength of about 380 nm is provided.

According to another aspect of embodiments of the present invention, an adhesive film for polarizing plates having a thickness of about 15 μm or less, a peel strength of about 700 gf/inch or more with respect to an adherend, and a creep of about 100 μm or less at about 25° C. is provided.

According to a further aspect of embodiments of the present invention, an adhesive film for polarizing plates having a thickness of about 15 μm or less, and free from a bleed-out of a UV absorbent is provided.

DETAILED DESCRIPTION

Figures 1A, 1B:
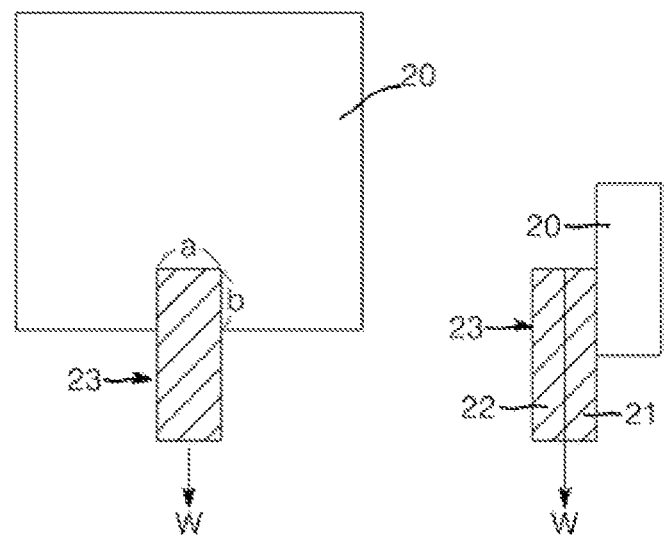
FIGS. 1A and 1B are schematic diagrams illustrating measurement of creep from a front view and a partial side view, respectively.

Herein, some example embodiments of the present invention will be described in further detail with reference to the accompanying drawings. However, it is to be understood that the present invention is not limited to the following embodiments and may be embodied in various ways. The following embodiments are provided to provide a thorough understanding of the invention to those skilled in the art.

Herein, "peel strength" of an adhesive film for polarizing plates means a 180° peel strength between the adhesive film and a glass plate, as measured at 25° C. in accordance with JIS2107.

As used herein, the term "(meth)acryl" refers to acryl and/or methacryl.

Herein, the "weight average molecular weight" is a value obtained by gel permeation chromatography with respect to a (meth)acrylic copolymer in accordance with polystyrene standards.

Herein, "X to Y" indicates "X or more to Y or less" or "X≤ and ≤Y".

The adhesive film according to one or more embodiments of the present invention is an adhesive film for polarizing plates capable of bonding a polarizing plate and an organic light emitting device panel. The adhesive film may have a low light transmittance at a wavelength of about 380 nm, thereby preventing or substantially preventing discoloration and/or damage of an organic light emitting device, is free from a bleed-out of an UV absorbent, may obtain both high peel strength of about 700 gf/inch or more with respect to an organic light emitting device panel and a creep of about 100 μm or less at about 25° C., which are in a trade-off relationship with each other, even when the adhesive film has a thin thickness of 15 μm or less, and may secure excellent processability and durability.

Herein, an adhesive film for polarizing plates (herein, referred to as "adhesive film") according to some example embodiments of the invention will be described.

The adhesive film may block a UV light incident from the outside, thereby preventing or substantially preventing discoloration and/or damage of an organic light emitting device. The adhesive film may have a light transmittance of about 3% or less, for example, about 0.001% to about 3%, at a wavelength of about 380 nm. Within this range, the adhesive film is capable of preventing or substantially preventing discoloration and/or damage of an organic light emitting device.

In an embodiment, the adhesive film may have a glass transition temperature of about −47° C. to about −40° C. (for example, −47, −46, −45, −44, −43, −42, −41, or −40° C.), and, in one embodiment, about −45° C. to about −40° C. Within this range, both peel strength and cohesive strength, which are in a trade-off relationship with each other, can be improved together, even when the adhesive film has a thin thickness.

The adhesive film may have a thickness of about 15 μm or less, for example, about more than 0 μm and about 15 μm or less, and, in one embodiment, about 10 μm to about 15 μm. Within this range, a thinner polarizing plate can be attained.

The adhesive film may have a peel strength of about 700 gf/inch or more and a creep of about 100 μm or less at about 25° C. Within the above creep range, the adhesive film laminated to the polarizing plate may be easy to cut and process, and thus may secure excellent processability. Further, within the above peel strength range, the adhesive film may not be separated from the organic light emitting device panel even when the adhesive film has a thin thickness, and may have good durability without delamination or slight lifting even at high temperature/humidity conditions. In an embodiment, the adhesive film may have a creep of about 50 μm to about 100 μm, for example, about 50 μm to about 80 μm, at about 25° C. In an embodiment, the adhesive film may have a peel strength of about 700 gf/inch to about 1200 gf/inch (for example, 700, 800, 900, 1000, 1100, or 1200 gf/inch)

The adhesive film may be formed of an adhesive composition comprising: a (meth)acrylic copolymer; an adhesion promoter comprising an aromatic modified terpene resin having a glass transition temperature of about 90° C. or more; a mixture of an isocyanate curing agent and a carbodiimide curing agent; and a UV absorbent.

Herein, the adhesive composition will be described in further detail.

UV Absorbent

The adhesive composition may include a hydroxyphenyl triazine-based UV absorbent being in a liquid state at 25° C. as a UV absorbent. The hydroxyphenyl triazine-based UV absorbent in a liquid state at 25° C. can impart a light transmittance of about 3% or less at a wavelength of about 380 nm to the adhesive film and can help to obtain an adhesive film free from a bleed-out of an UV absorbent. If the UV absorbent is not in a liquid state at 25° C. or the UV absorbent is in a liquid state, but not a hydroxyphenyl triazine-based UV absorbent, the adhesive film obtained therefrom may have a light transmittance of more than 3% at a wavelength of about 380 nm and/or may suffer from bleed-out.

In an embodiment, the hydroxyphenyl triazine-based UV absorbent in a liquid state at 25° C. may have a maximum absorption wavelength of about 300 nm to about 400 nm (for example, 300, 310, 320, 330, 340, 350, 360, 370, 380, 390, or 400 nm).

Herein, "maximum absorption wavelength" refers to a wavelength at which the maximum absorbance appears, when the absorbance is measured for a solution containing a UV absorbent at a concentration of 10 ppm in methylethyl ketone. For example, the UV absorbent may be Tinuvin 477.

The UV absorbent may be present in an amount of about 0.1 part by weight to about 3 parts by weight, and, in one embodiment, about 0.1 part by weight to about 2 parts by weight, or about 0.1 part by weight to about 1.5 parts by weight in terms of solid content, relative to about 100 parts by weight of the (meth)acrylic copolymer. Within this range, the adhesive film may have a light transmittance of about 3% or less at a wavelength of about 380 nm and may be free from bleed-out even at a thin thickness.

(Meth)Acrylic Copolymer

The (meth)acrylic copolymer may have a weight average molecular weight of about 1,200,000 or more. Within this range, the adhesive film may obtain increased peel strength and may impart improved reliability under high temperature and high humidity conditions. For example, the (meth)acrylic copolymer may have a weight average molecular weight of about 1,400,000 or more, and, in an embodiment, about 1,400,000 to about 1,600,000.

In an embodiment, the (meth)acrylic copolymer may have a glass transition temperature of about −40° C. or less, for example, about −43° C. to about −40° C. Within this range, the adhesive film may impart improved reliability under high temperature and high humidity conditions.

The (meth)acrylic copolymer can form a matrix of the adhesive film and provides adhesive strength to the adhesive film. The (meth)acrylic copolymer may include a copolymer of a monomer mixture comprising an alkyl group-containing (meth)acrylic monomer and a crosslinkable functional group-containing (meth)acrylic monomer.

The alkyl group-containing (meth)acrylic monomer may be a $C_1$ to $C_{20}$ alkyl group-containing (meth)acrylate and may include at least one of methyl(meth)acrylate, ethyl (meth)acrylate, propyl(meth)acrylate, n-butyl(meth)acrylate, iso-butyl(meth)acrylate, pentyl(meth)acrylate, hexyl (meth)acrylate, 2-ethylhexyl(meth)acrylate, heptyl(meth) acrylate, octyl(meth)acrylate, iso-octyl(meth)acrylate, nonyl (meth)acrylate, decyl(meth)acrylate, dodecyl(meth)acrylate, without being limited thereto.

In an embodiment, the (meth)acrylic copolymer may be a copolymer of a mixture comprising a crosslinkable functional group-containing (meth)acrylic monomer and at least one of n-butyl(meth)acrylate and 2-ethylhexyl(meth)acrylate.

The crosslinkable functional group-containing (meth) acrylic monomer may include at least one of hydroxyl group-containing (meth)acrylic monomer and carboxylic acid group-containing (meth)acrylic monomer. In an embodiment, the crosslinkable functional group-containing (meth)acrylic monomer includes the hydroxyl group-containing (meth)acrylic monomer, and may not include the carboxylic acid group-containing (meth)acrylic monomer. As a result, the acid value may be lowered, and corrosion of a metal adherend can be prevented or substantially prevented.

The hydroxyl group-containing (meth)acrylic monomer may include at least one of a hydroxyl group-containing $C_1$ to $C_{20}$ alkyl group-containing (meth)acrylic monomer, a hydroxyl group-containing $C_3$ to $C_{20}$ cycloalkyl group-containing (meth)acrylic monomer, and a hydroxyl group-containing $C_6$ to $C_{20}$ aromatic group-containing (meth)acrylic monomer. For example, the hydroxyl group-containing (meth)acrylic monomer may include at least one of 2-hydroxyethyl(meth)acrylate, 2-hydroxypropyl(meth)acrylate, 2-hydroxybutyl(meth)acrylate, 4-hydroxybutyl(meth)acrylate, 6-hydroxyhexyl(meth)acrylate, 1,4-cyclohexanedimethanol mono(meth)acrylate, 1-chloro-2-hydroxypropyl (meth)acrylate, diethylene glycol mono(meth)acrylate, 2-hydroxy-3-phenyloxypropyl(meth)acrylate, 4-hydroxycyclopentyl (meth)acrylate and 4-hydroxycyclohexyl (meth) acrylate.

In an embodiment, the monomer mixture may comprise about 60 wt % to about 99 wt %, for example, about 90 wt % to about 99 wt %, of the alkyl group-containing (meth) acrylic monomer, and about 1 wt % to about 40 wt %, for example, about 1 wt % to about 10 wt %, of the hydroxyl group-containing (meth)acrylic monomer as the crosslinkable functional group-containing (meth)acrylic monomer. Within this range, the (meth)acrylic copolymer may have the above glass transition temperature and may exhibit adhesive properties.

The above ranges of the weight average molecular weight and the glass transition temperature of the (meth)acrylic copolymer can be achieved by controlling polymerization conditions, such as temperature, polymerization time, amount of initiator, and the like, during the polymerization of the monomer mixture. In an embodiment, the polymerization may be performed at about 60° C. to about 70° C. for about 6 hours to about 8 hours. As an initiator, any typical initiator including azo-based polymerization initiators and/ or peroxide polymerization initiators, such as benzoyl peroxide or acetyl peroxide, may be used. The polymerization may be performed by a typical method known in the art, such as any of suspension polymerization, emulsion polymerization, solution polymerization, and the like.

Mixture of Curing Agents

The curing agent cures (meth)acrylic copolymer and may help to increase the adhesive strength of the adhesive film and secure the glass transition temperature of the adhesive film of about −47° C. to −40° C.

In an embodiment, the curing agent may include a mixture of an isocyanate curing agent and a carbodiimide curing agent. By using the mixture of the isocyanate curing agent and the carbodiimide curing agent, the adhesive film can secure a creep of about 100 μm or less at about 25° C., a peel strength of about 700 gf/inch or more at about 25° C. while preventing or substantially preventing bleed-out of a UV absorbent, when the adhesive film contains a liquid UV absorbent at 25° C.

When only the isocyanate curing agent is used as the curing agent without using the carbodiimide curing agent, the adhesive film may have a creep of more than about 100 μm at about 25° C. due to a reduction in cohesive strength of the adhesive film. When only the carbodiimide curing agent is used as the curing agent without using the isocyanate curing agent, there may be a problem of an increased aging period of the adhesive.

If the curing agent contains a different type of curing agent other than the mixture of isocyanate curing agent and carbodiimide curing agent, the adhesive film cannot achieve the properties of a creep of about 100 μm or less and a peel strength of about 700 gf/inch or more at about 25° C. at a film thickness of about 15 μm or less.

The isocyanate curing agent may be present in an amount of about 0.5 parts by weight to about 20 parts by weight, and, in one embodiment, about 0.5 parts by weight to about 5 parts by weight, for example, about 0.5 parts by weight to about 2 parts by weight, relative to about 100 parts by weight of the (meth)acrylic copolymer. Within this range, the adhesive film can obtain a balance between cohesive strength and peel strength.

The carbodiimide curing agent may be present in an amount of about 0.01 part by weight to about 0.5 parts by weight, and, in one embodiment, about 0.02 parts by weight to about 0.2 parts by weight, relative to about 100 parts by weight of the (meth)acrylic copolymer. Within this range, the adhesive film can obtain a balance between cohesive strength and peel strength.

In the mixture of curing agents, the isocyanate curing agent may be present in an excessive amount relative to the carbodiimide curing agent. In an embodiment, the isocyanate curing agent and the carbodiimide curing agent may be present in a weight ratio of about 2:1 to about 150:1, for example, about 2:1 to about 100:1 (isocyanate curing agent: carbodiimide curing agent). Within this range, excellent performance can be obtained.

The isocyanate curing agent may include an aromatic isocyanate or an adduct of an aromatic isocyanate to a polyol compound. By using this, the adhesive film may have a creep of about 100 μm or less at about 25° C. at a thickness of about 15 μm or less. When an aliphatic isocyanate curing agent such as hexamethylene diisocyanate (HDI), etc. is included in the composition, the adhesive film cannot secure a creep of about 100 μm or less at 25° C.

The isocyanate curing agent may include at least one of xylenediisocyanate (XDI) such as m-xylenediisocyanate, etc., methylenebis(phenyl isocyanate) (MDI) such as 4,4'-methylenebis(phenyl isocyanate), etc., naphthalene diisocyanate, toluene diisocyanate (TDI), or a polyol-modified adduct thereof. For example, the isocyanate curing agent may include a polyol-modified adduct of a TDI isocyanate curing agent.

The carbodiimide curing agent may include a typical curing agent which contains at least two carbodiimide groups (*—N=C=N—*, wherein * is a linking site) in a molecule. In an embodiment, the carbodiimide curing agent may include a curing agent obtained by decarboxylation condensation reaction of a diisocyanate compound. The diisocyanate compound may include diphenylmethane diisocyanate, dimethoxydiphenylmethane diisocyanate, etc.

The curing agent may be present in an amount of about 0.5 parts by weight to about 5 parts by weight, and, in one embodiment, about 0.5 parts by weight to about 3 parts by weight, relative to about 100 parts by weight of the (meth) acrylic copolymer. Within this range, the adhesive film can have improved processability and good adhesive strength.

Adhesion Promoter

The adhesive film comprises an adhesion promoter. The adhesion promoter may include an aromatic modified terpene resin having a glass transition temperature of about 90° C. or more. By using this adhesion promoter, the adhesive film may have a peel strength of about 700 gf/inch or more at about 25° C. at a film thickness of about 15 μm or less.

If the adhesion promoter has a glass transition temperature of about 90° C. or more, but contains a different type of adhesion promoter other than the aromatic modified terpene resin, the adhesive film cannot achieve the effect of the present invention and may have an increased haze due to poor compatibility with the (meth)acrylic copolymer. Likewise, if the adhesion promoter contains the aromatic modified terpene resin, but has a glass transition temperature of less than 90° C., the adhesive film cannot achieve the effect of the present invention and may have an increased haze due to poor compatibility with the (meth)acrylic copolymer.

In an embodiment, the aromatic modified terpene resin may have a glass transition temperature of about 90° C. to about 120° C., and, in one embodiment, about 90° C. to about 110° C. Within this range, the adhesive film may have an increased peel strength even at a thin thickness.

The aromatic modified terpene resin may have a weight average molecular weight of about 900 or more, and, in one embodiment, about 900 to about 2,000, for example, about 900 to about 1,500. Within this range, the adhesive film may have an increased adhesive strength even at a thin thickness.

The adhesion promoter, for example, the aromatic modified terpene resin, may be present in an amount of about 1 part by weight to about 10 parts by weight (for example, 1, 2, 3, 4, 5, 6, 7, 8, 9, or 10 parts by weight), and, in one embodiment, about 1 part by weight to about 5 parts by weight, relative to about 100 parts by weight of the (meth) acrylic copolymer. Within this range, the adhesive film may have an increased peel strength and a decreased haze.

Silane Coupling Agent

The adhesive composition may further include a silane coupling agent. The silane coupling agent can improve adhesive strength of the adhesive film with respect to an adherend. The silane coupling agent may include a typical silane coupling agent known to those skilled in the art. For example, the silane coupling agent may include an epoxy-group containing silane coupling agent, such as glycidoxypropyltrimethoxysilane, glycidoxypropylmethyldimethoxysilane, and the like, without being limited thereto. The silane coupling agent may be present in an amount of about 0.01 part by weight to about 5 parts by weight, and, in one embodiment, about 0.05 parts by weight to about 1 part by weight, relative to about 100 parts by weight of the (meth) acrylic copolymer. Within this range, the adhesive film can have improved adhesive strength.

Additives

The adhesive composition may further include additives. The additives may include, but are not limited to, one or more of a reaction inhibitor, an adhesion promoter, a thixotropic agent, a conductivity imparting agent, a color adjusting agent, a stabilizer, an antistatic agent, an antioxidant, and a leveling agent.

Next, a polarizing plate according to an embodiment will be described.

The polarizing plate may comprise a polarizer; and the adhesive film for polarizing plates formed on a surface of the polarizer, in which the adhesive film is the adhesive film for polarizing plates according to an embodiment of the present invention.

The polarizer may include a polarizer made of a polyvinyl alcohol resin film. In an embodiment, the polarizer may include a polyvinyl alcohol-based polarizer manufactured by dyeing the polyvinyl alcohol resin film with at least one of iodine and a dichroic dye, or may be a polyene-based polarizer manufactured by dehydrating the polyvinyl alcohol resin film.

In one embodiment, the polarizer may include a polarizer prepared by stretching a polyvinyl alcohol resin film having a thickness of about 20 μm to about 100 μm to a total stretching ratio of about 2-10 times, and, in an embodiment, about 4-8 times in a machine direction. Generally, shrinkage of the polarizer may depend on a total stretching ratio during the manufacturing process. The stretching may be performed by a single-stage stretching or a multi-stage stretching, but is not limited thereto.

In an embodiment, the polarizer may have a thickness of about 5 μm to about 30 μm, and, in an embodiment, about 5 μm to about 20 μm. Within this range, the polarizer can be used in the polarizing plate and can realize thickness reduction of the polarizing plate.

In an embodiment, a first protective layer and a second protective layer may be adhered to both surfaces of the polarizer by an adhesive for polarizing plates. The adhesive for polarizing plates may be a typical adhesive known to those skilled in the art.

In one embodiment, the first protective layer may include a protective film or a protective coating layer. The protective film may include a film formed of an optically transparent resin. In an embodiment, the resin may include at least one of cyclic polyolefin resins including amorphous cyclic olefin polymer (COP), poly(meth)acrylate resins, polycarbonate resins, polyester resins including polyethylene terephthalate (PET), cellulose ester resins including triacetylcellulose (TAC), polyether sulfone resins, polysulfone resins, polyamide resins, polyimide resins, non-cyclic polyolefin resins, polyarylate resins, polyvinyl alcohol resins, polyvinyl chloride resins, and polyvinylidene chloride resins. In an embodiment, the protective film may have a thickness of about 5 μm to about 200 μm, for example, about 10 μm to about 150 μm. When laminated with a polarizer, the first protective layer may be attached to the polarizer using a conventional bonding agent or adhesive.

In one embodiment, the protective coating layer may be optically transparent, and be formed of an actinic radiation-curable resin composition including an actinic radiation-curable compound and an initiator. In an embodiment, the protective coating layer may have a thickness of about 5 μm to about 200 μm, for example, about 5 μm to about 20 μm. Within this range, the protective coating layer can be used in the polarizing plate.

The second protective layer may be formed on a lower surface of the polarizer and on an upper surface of the adhesive film for polarizing plates to support the polarizer.

The second protective layer may be the same as or different from the first protective layer described above. In an embodiment, the second protective layer may have the thickness described above with respect to the first protective layer.

Next, an optical display according to an embodiment will be described.

The optical display may include the polarizing plate according to an embodiment of the present invention. The optical display may include an organic light emitting display, a flexible organic light emitting display, and the like, without being limited thereto.

The present invention will be described in further detail with reference to some examples. However, it is noted that these examples are provided for purposes of illustration and are not to be construed in any way as limiting the present invention.

Details of components used in Examples and Comparative Examples are as follows.

(A) copolymer: (meth)acrylic copolymer having a weight average molecular weight of 1,600,000 prepared by copolymerizing 90 wt % of n-butylacrylate and 10 wt % of 2-hydroxyethylacrylate.

(B1) isocyanate curing agent: Coronate L (adduct of aromatic diisocyanate to trimethylolpropane)

(B2) carbodiimide curing agent: (VO5S, Nisshinbo Chemical Inc.)

(B3) aliphatic diisocyanate curing agent: CK164, NCI (C1) terpene resin: aromatic modified terpene resin (Dertophene 1510, DRT, glass transition temperature: 100° C., weight average molecular weight: 1,000 to 1,500).

(C2) terpene resin: aromatic modified terpene resin (CK500L, NCI, glass transition temperature: 80° C., weight average molecular weight: 1,000).

(C3) rosin resin: rosin resin (KE100, Arakwa, glass transition temperature: 90° C.) as an adhesion promoter.

(D1) UV absorbent: Tinuvin 477 (hydroxyphenyl triazine, BASF, liquid state at 25° C.)

(D2) UV absorbent: Tinuvin 384 (hydroxyphenylbenzotriazole, liquid state at 25° C.)

(D3) UV absorbent: Tinuvin 479 (hydroxyphenyl triazine, solid state at 25° C.)

(E) silane coupling agent: 3-glycidoxypropyltrimethoxysilane Example 1

A composition for adhesive films was prepared by mixing 100 parts by weight of the (meth)acrylic copolymer (A), 0.5 parts by weight of the isocyanate curing agent (B1), 0.15 parts by weight of the carbodiimide curing agent (B2), 2 parts by weight of the terpene resin (C1), 1 part by weight of the UV absorbent (D1), and 0.1 part by weight of the silane coupling agent (E) in terms of solid content, adding 20 parts by weight of methylethylketone to obtain a mixture and stirring the mixture at 25° C. for 5 minutes. Then, the prepared composition was coated on a polyethylene terephthalate (PET) release film to a thickness of 20 μm, dried at 110° C. for 4 minutes, and left at 35° C. and 45% RH for 4 days, thereby preparing an adhesive sheet having a 12 μm thick adhesive film.

Example 2 to Example 7

Each adhesive sheet was prepared in the same manner as in Example 1 except that the contents of each component of the composition and the thicknesses of the adhesive films were changed as listed in Table 1.

Comparative Example 1 to Comparative Example 7

Each adhesive sheet was prepared in the same manner as in Example 1 except that the content of each component of the composition and/or the thicknesses of the adhesive films were changed as listed in Table 2. In Table 2, "-" means that the component is not included.

Physical properties of the adhesive films prepared in the Examples and Comparative Examples were evaluated by the following methods and the results are shown in Tables 1 and 2.

(1) Peel Strength (unit: gf/inch): each of the adhesive films prepared in the Examples and Comparative Examples was cut to a size of 150 mm×25 mm (length×width). A polarizing plate having a triacetylcellulose film, a polarizer, and a triacetylcellulose film sequentially stacked was prepared. Then, the adhesive film was laminated to the triacetylcellulose film of the polarizing plate, and the other side of the adhesive film was adhered to a glass plate (alkali-free glass), followed by reciprocating a 2 kg roller once to prepare a specimen. Peel strength was measured 20 minutes after the specimen was prepared. Peel strength was measured using a Texture Analyzer by peeling the polarizing plate from the glass plate under conditions of a peeling speed of 300 mm/min and a peeling angle of 180° at 25° C. and 65% RH.

(2) Light Transmittance (unit: %, @380 nm): with the adhesive films prepared in the Examples and Comparative Examples, light transmittance was measured using a UV-Spectrophotometer (V-650, JASCO Co., Ltd., Japan).

(3) Durability: each of polarizing plates (100 mm×80 mm) was attached to a glass plate via the adhesive film prepared in the Examples and Comparative Examples and compressed under a pressure of 4 to 5 kg/cm² to prepare specimens.

Some specimens were left at 60° C. and 95% RH for 500 hours in order to evaluate a heat and humidity resistant reliability (a first test).

Some specimens were subjected to repeating the following cycle 200 times to evaluate a heat shock property (a second test).

One cycle was conducted in the order of leaving the specimen at −40° C. for 20 minutes, heating the specimen from −40° C. to 80° C. in 10 minutes, leaving the specimen at 80° C. for 20 minutes, and cooling the specimen from 80° C. to −40° C. in 1 minute.

Durability was evaluated according to the following criteria by observing both specimens of the first and the second tests with the naked eyes.

No bubbles on the adhesive film and no delamination between the adhesive film and the protective film in any of the specimens of the first and the second tests was rated as "OK." Occurrence of slight or significant bubbles or delamination in any of the specimens of the first and the second tests was rated as "NG."

(4) Creep (unit: μm): referring to FIGS. 1A and 1B, creep was measured with respect to the adhesive film for polarizing plates. A polarizing plate was prepared by sequentially laminating a triacetylcellulose film, a PVA polarizer, and a triacetylcellulose film using a water-based adhesive. The adhesive film prepared in the Examples and Comparative Examples was laminated on one side of the triacetylcellulose film of the polarizing plate, followed by cutting to a size of 50 mm×15 mm (length×width) to obtain a specimen 23 in which a polarizing plate 22 and an adhesive film 21 are laminated. Then, the specimen 23 was laminated on an alkali-free glass plate 20 to form a laminated area of 15 mm×15 mm (a×b). Creep was measured by using a TEXTURE ANALYZER TA.XT Plus (load cell 5 kg, EKO Instruments.). Creep was evaluated when the specimen was left at a constant temperature of 25° C. under a load of 2250 g for 1,000 seconds.

(5) Glass Transition Temperature of Adhesive Film (unit: ° C.): glass transition temperature of the adhesive films prepared in the Examples and Comparative Examples was measured using a Differential Scanning Calorimeter.

(6) Bleed-Out of UV absorbent: bleed-out was evaluated according to the following criteria by observing the adhesive film prepared in the Examples and Comparative Examples with the naked eyes:

If the adhesive film did not become opaque, it was considered that there was no bleed-out and evaluated as "OK."

If the adhesive film became opaque, it was considered that bleed-out occurred and evaluated as "NG."

TABLE 1

|  |  | Example |  |  |  |  |  |  |
|---|---|---|---|---|---|---|---|---|
|  |  | 1 | 2 | 3 | 4 | 5 | 6 | 7 |
| Copolymer | (A) | 100 | 100 | 100 | 100 | 100 | 100 | 100 |
| Curing | (B1) | 0.5 | 1 | 1.5 | 0.5 | 2 | 1 | 0.7 |
| Agent | (B2) | 0.15 | 0.05 | 0.1 | 0.2 | 0.02 | 0.1 | 0.15 |
| Adhesion Promoter | (C1) | 2 | 3 | 5 | 2.5 | 1 | 2 | 3 |
| UV Absorbent | (D1) | 1 | 0.5 | 0.2 | 0.7 | 0.35 | 1.5 | 0.8 |
| Silane Coupling Agent | (E) | 0.1 | 0.08 | 0.1 | 0.06 | 0.05 | 0.3 | 0.5 |
| Thickness of Adhesive Film |  | 12 | 13 | 11 | 13 | 15 | 14.5 | 13 |
| Peel Strength |  | 850 | 900 | 1000 | 750 | 730 | 820 | 900 |
| Light Transmittance |  | 1 | 0.5 | 1.2 | 0.8 | 1.5 | 0.4 | 1.3 |
| Durability |  | OK | OK | OK | OK | OK | OK | OK |
| Creep |  | 75 | 60 | 55 | 70 | 50 | 57 | 65 |
| Tg of Adhesive Film |  | −42.5 | −41.3 | −40.5 | −42 | −43 | −42.2 | −41.5 |
| Bleed-out of UV absorbent |  | OK | OK | OK | OK | OK | OK | OK |

TABLE 2

|  |  | Comparative Example |  |  |  |  |  |  |
|---|---|---|---|---|---|---|---|---|
|  |  | 1 | 2 | 3 | 4 | 5 | 6 | 7 |
| Copolymer | (A) | 100 | 100 | 100 | 100 | 100 | 100 | 100 |
| Curing Agent | (B1) | 0.5 | — | 0.5 | 0.5 | 0.5 | 0.5 | 0.5 |
|  | (B2) | — | 0.5 | — | 0.15 | 0.15 | 0.15 | 0.15 |
|  | (B3) | — | — | 0.15 | — | — | — | — |
| Adhesion Promoter | (C1) | 2 | 2 | 2 | — | — | 2 | 2 |
|  | (C2) | — | — | — | 2 | — | — | — |
|  | (C3) | — | — | — | — | 2 | — | — |
| UV Absorbent | (D1) | 1 | 1 | 1 | 1 | 1 | — | — |
|  | (D2) | — | — | — | — | — | 1 | — |
|  | (D3) | — | — | — | — | — | — | 1 |
| Silane Coupling Agent | (E) | 0.1 | 0.1 | 0.1 | 0.1 | 0.1 | 0.1 | 0.1 |
| Thickness of Adhesive Film |  | 12 | 13.5 | 15 | 14 | 13 | 12 | 13.5 |
| Peel Strength |  | 680 | 600 | 650 | 750 | 550 | 780 | 630 |
| Light Transmittance |  | 2.8 | 2.7 | 2 | 2 | 2.5 | 20 | 40 |
| Durability |  | OK | OK | OK | OK | NG | OK | OK |
| Creep |  | 130 | 125 | 115 | 130 | 135 | 140 | 150 |
| Tg of Adhesive Film |  | −48 | −49 | −48.2 | −49 | −49.2 | −48.3 | −48.5 |
| Bleed-Out Of UV Absorbent |  | OK | OK | OK | OK | OK | NG | NG |

As shown in Table 1, the adhesive films for polarizing plates according to the present invention exhibited low light transmittance even at a wavelength of about 380 nm, no bleed-out of UV absorbent, and secured both properties of a peel strength of about 700 gf/inch or more and a creep of about 100 μm or less at about 25° C. even at a thickness of 15 μm or less.

On the other hand, the adhesive films of the Comparative Examples could not obtain all of the above properties, as shown in Table 2.

It is to be understood that, while some example embodiments have been described herein, various modifications, changes, alterations, and equivalent embodiments can be made by those skilled in the art without departing from the spirit and scope of the present invention.

What is claimed is:

1. An adhesive film for polarizing plates formed of an adhesive composition comprising: a (meth)acrylic copolymer; an adhesion promoter; a mixture of an isocyanate curing agent and a carbodiimide curing agent; and a UV absorbent, wherein
   the adhesive film has a glass transition temperature of about −47° C. to about −40° C.,
   the adhesive film has a light transmittance of about 3% or less at a wavelength of about 380 nm,
   the adhesion promoter comprises an aromatic modified terpene resin having a glass transition temperature of about 90° C. or more,
   the adhesive film for polarizing plates has a peel strength of about 700 gf/inch to 1200 gf/inch with respect to a glass plate at about 25° C., and has a creep of about 100 μm or less at about 25° C., and
   in the mixture of the isocyanate curing agent and the carbodiimide curing agent, a weight ratio of the isocyanate curing agent to the carbodiimide curing agent is about 2:1 to about 150:1.

2. The adhesive film according to claim 1, wherein the UV absorbent is in a liquid state at 25° C., and includes a hydroxyphenyl triazine-based UV absorbent.

3. The adhesive film according to claim 1, wherein the UV absorbent has a maximum absorption wavelength of about 300 nm to about 400 nm.

4. The adhesive film according to claim 1, wherein the isocyanate curing agent comprises an aromatic isocyanate or an adduct of an aromatic isocyanate to a polyol compound.

5. The adhesive film according to claim 1, wherein the aromatic modified terpene resin having a glass transition temperature of about 90° C. or more has a weight average molecular weight of about 900 or more.

6. The adhesive film according to claim 1, wherein the aromatic modified terpene resin having a glass transition temperature of about 90° C. or more is present in an amount of about 1 part by weight to about 10 parts by weight, relative to about 100 parts by weight of the (meth)acrylic copolymer.

7. The adhesive film according to claim 1, wherein the (meth)acrylic copolymer includes a copolymer of a monomer mixture comprising about 60 wt % to about 99 wt % of an alkyl group-containing (meth)acrylic monomer and about 1 wt % to about 40 wt % of a hydroxyl group-containing (meth)acrylic monomer.

8. The adhesive film according to claim 1, wherein the adhesive composition comprises:
    about 100 parts by weight of the (meth)acrylic copolymer,
    about 0.1 part by weight to about 3 parts by weight of the UV absorbent,
    about 0.5 parts by weight to about 20 parts by weight of the isocyanate curing agent,
    about 0.01 part by weight to about 0.5 parts by weight of the carbodiimide curing agent, and
    about 1 part by weight to about 10 parts by weight of the adhesion promoter.

9. The adhesive film according to claim 1, wherein the adhesive film has a thickness of about 15 μm or less.

10. A polarizing plate comprising:
    a polarizer; and
    the adhesive film for polarizing plates according to claim 5 on a surface of the polarizer.

11. A polarizing plate comprising:
    a polarizer; and
    the adhesive film for polarizing plates according to claim 3 on a surface of the polarizer.

12. A polarizing plate comprising:
    a polarizer; and
    the adhesive film for polarizing plates according to claim 4 on a surface of the polarizer.

13. A polarizing plate comprising:
    a polarizer; and
    the adhesive film for polarizing plates according to claim 1 on a surface of the polarizer.

14. An optical display comprising the polarizing plate according to claim 10.

15. An optical display comprising the polarizing plate according to claim 11.

16. An optical display comprising the polarizing plate according to claim 13.

* * * * *